(No Model.)
W. W. ROSENSTEEL.
CAR WHEEL.
No. 603,600. Patented May 3, 1898.
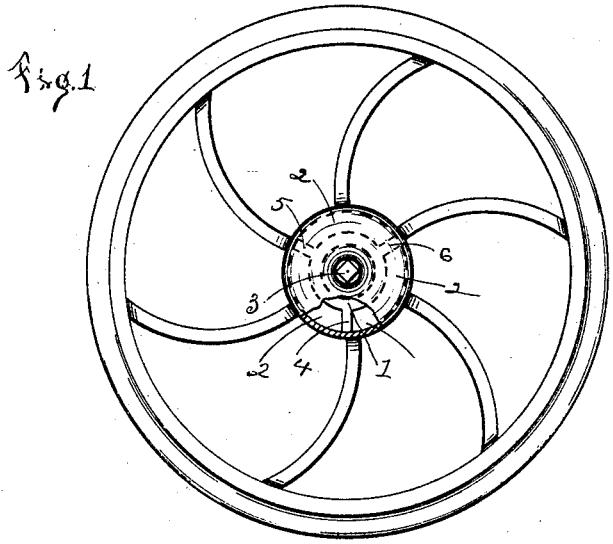
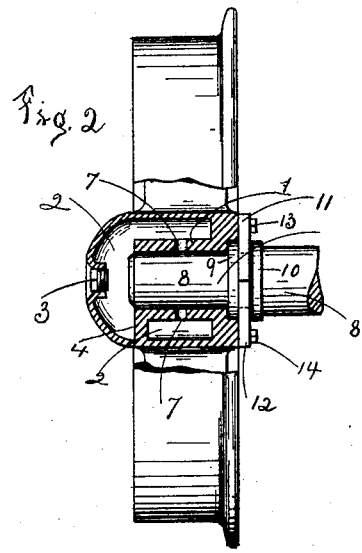
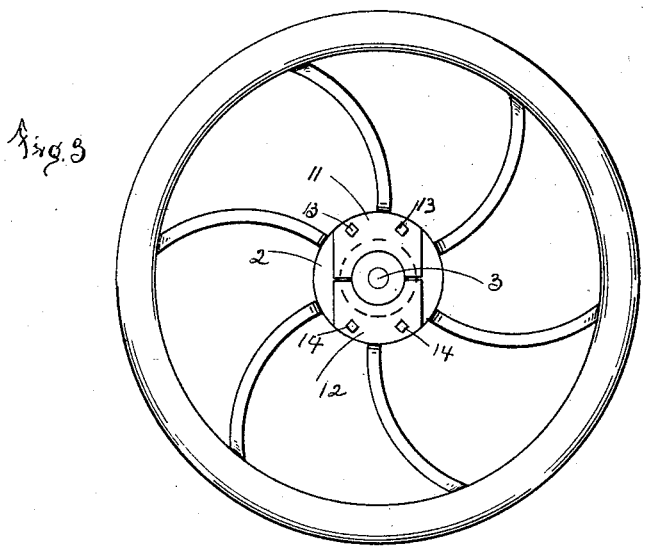
Witnesses:
Richard S. Harrison.
Inventor
W W Rosensteel
Per C D Levis
Att'y

UNITED STATES PATENT OFFICE.

WILLIAM W. ROSENSTEEL, OF MINERAL RIDGE, OHIO.

CAR-WHEEL.

SPECIFICATION forming part of Letters Patent No. 603,600, dated May 3, 1898.

Application filed July 21, 1897. Serial No. 645,304. (No model.)

*To all whom it may concern:*

Be it known that I, WILLIAM W. ROSENSTEEL, a citizen of the United States, residing at Mineral Ridge, in the county of Trumbull and State of Ohio, have invented certain new and useful Improvements in Car-Wheels and Means for Attaching the Same to the Axles; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to certain new and useful improvements in car-wheels and means for attaching the same to the axles.

The invention has for its object the construction of a car-wheel having an oil-chamber formed around the bearing or hub which is so arranged as to give a perfect feed of the lubricant to the bearing parts and at the same time exclude all dust and dirt, and also to provide means for securely attaching the wheel to the axle.

With the above objects in view the invention consists in the novel construction, combination, and arrangements of parts, as will be hereinafter more specifically described in detail.

In describing the invention in detail reference is had to the accompanying drawings, forming a part of this specification, and wherein like numerals designate like parts throughout the several views, in which—

Figure 1 is a vertical side view of my improved wheel. Fig. 2 is a vertical edge view of the same. Fig. 3 is a vertical view of the opposite side of the wheel.

In the drawings the numeral 1 designates the hub of the wheel, and around this hub is formed the hollow chamber 2, which projects outwardly a short distance on the outer side of the wheel and is rounded off, as shown. A depressed portion is formed at the said outer side, and within this depressed portion is formed an opening for the insertion of the lubricant and is fitted with the removable screw-plug 3. Ribs 4, 5, and 6 are formed between and made a part of the outer portion of the hub and the inner wall of the chamber and which ribs extend out even with the end of the hub. Formed within the hub and between aforesaid ribs are the holes 7, through which the oil is fed to the bearing. Upon the car-axle 8 are formed the collars 9 and 10, which may be of any convenient size, and on the inner face of the wheel-hub is formed a seat of sufficient size for the reception of the collar 9. A pair of key-plates 11 and 12 of sufficient thickness are formed in the shape shown and fitted down between the collars of the axle and attached to the wheel-hub by the screws 13 and 14, so as to secure the wheel in place to the axle and at the same time exclude all dirt which otherwise might enter the bearing.

When the wheels are attached in place to the axles, the screw-plug 3 is removed and the chamber partly filled with oil, and during the movement of the wheel the oil feeds through the openings 7 to the bearing.

The wheel is particularly adapted for mine use, and in some of the mines the cars when not in use are turned over upon their side out of the way, thus allowing the oil in the ordinary wheel-bearing to run out; but with a car fitted with my improved wheel this is overcome.

Slight variations may be made in the detail parts of the construction without departing from the general spirit of my invention.

Having thus fully shown and described my invention, what I claim as new, and desire to secure by Letters Patent, is—

A car-wheel having a hub inclosed by an oil-chamber, and a seat in the inner face of the hub, in combination with the wheel-axle provided with two collars, one of said collars being adapted to be fitted in the said seat in the hub, and a pair of key-plates adapted to enter between the two collars, said key-plates being attached to the car-wheel by means of screws, substantially as shown and described.

In testimony whereof I affix my signature in presence of two witnesses.

WILLIAM W. ROSENSTEEL.

Witnesses:
ALBERT J. WALKER,
H. J. LEVIS.